(12) United States Patent  (10) Patent No.: US 8,924,862 B1
Luo  (45) Date of Patent: Dec. 30, 2014

(54) OPTIMIZING DESKTOP SHARING FOR WIRELESS CLIENTS DURING NETWORKED COLLABORATION

(75) Inventor: Zhonghui Luo, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1344 days.

(21) Appl. No.: 12/205,741

(22) Filed: Sep. 5, 2008

(51) Int. Cl.
*G06F 3/00* (2006.01)
*G06F 9/54* (2006.01)

(52) U.S. Cl.
CPC ..................... *G06F 9/543* (2013.01)
USPC ............ 715/753; 715/751; 715/759; 715/760

(58) Field of Classification Search
CPC ........................................ G06F 9/543
USPC ................... 715/759, 760, 751, 753
See application file for complete search history.

(56) References Cited

U.S. PATENT DOCUMENTS

| | | | |
|---|---|---|---|
| 5,867,495 A | 2/1999 | Elliott et al. | |
| 5,874,960 A * | 2/1999 | Mairs et al. | 715/733 |
| 6,310,862 B1 | 10/2001 | Roy | |
| 6,735,633 B1 | 5/2004 | Welch et al. | |
| 7,293,243 B1 * | 11/2007 | Ben-Shachar et al. | 715/781 |
| 7,392,484 B1 * | 6/2008 | Garfinkel et al. | 715/751 |
| 7,441,270 B1 | 10/2008 | Edwards et al. | |
| 7,627,629 B1 | 12/2009 | Wu et al. | |
| 2002/0075844 A1 | 6/2002 | Hagen | |
| 2002/0133611 A1 | 9/2002 | Gorsuch et al. | |
| 2003/0072429 A1 | 4/2003 | Slobodin et al. | |
| 2003/0084104 A1 | 5/2003 | Salem et al. | |
| 2003/0105812 A1 | 6/2003 | Flowers et al. | |
| 2003/0167305 A1 | 9/2003 | Zhu et al. | |
| 2004/0165768 A1 | 8/2004 | Zhang et al. | |
| 2005/0262201 A1 | 11/2005 | Rudolph et al. | |
| 2005/0288961 A1 | 12/2005 | Tabrizi | |
| 2006/0050686 A1 | 3/2006 | Velez-Rivera et al. | |
| 2007/0239825 A1 | 10/2007 | Walter | |
| 2007/0285503 A1 | 12/2007 | Asthana et al. | |
| 2008/0034104 A1 | 2/2008 | Kariti et al. | |
| 2008/0104545 A1 | 5/2008 | Palmieri et al. | |
| 2008/0120370 A1 | 5/2008 | Chan et al. | |
| 2009/0210490 A1 | 8/2009 | Hawkins et al. | |
| 2010/0088414 A1 | 4/2010 | Lin et al. | |

* cited by examiner

*Primary Examiner* — Andrey Belousov
(74) *Attorney, Agent, or Firm* — Hickman Palermo Truong Becker Bingham Wong LLP (57) ABSTRACT

Techniques for optimizing desktop sharing for wireless clients during web collaboration are presented. In one embodiment, a computer-implemented method comprises determining that a presenter of a collaborative online meeting is using a desktop sharing session, determining that one or more attendees participating in the collaborative online meeting are using devices with limited display capabilities, determining a particular window displayed on the desktop of the presenter of the desktop sharing session, and causing transmission of only data from the particular window displayed on the desktop of the presenter to the one or more devices.

27 Claims, 10 Drawing Sheets

OPTIMIZING DESKTOP SHARING FOR WIRELESS CLIENTS DURING NETWORKED COLLABORATION

TECHNICAL FIELD

The present disclosure generally relates online meetings and collaboration. The disclosure relates more specifically to techniques for sharing a presenter's desktop during a web collaboration session

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Online conferences held over networks such as the Internet and using World Wide Web sites are becoming more popular. Recent advances in the web conference technology allow the attendees to participate in the same live meeting from offices all over the world.

Other advantage of web conferences is that the attendees may join the conference via a variety of computers. Attendees may join the web conference from computers physically connected to a network, as well as from various wireless devices, which communicate with the presenter's computer over a wireless network or internetworks.

However, as much as the hardware heterogeneity is advantageous in web conferencing, the fact that the devices have different display capabilities poses a myriad of problems. These problems may be experienced as much by the presenters as by the attendees. For example, if a presenter conducts a presentation from a computer equipped with a large, high-resolution screen, the conference attendees who joined the conference via devices having very limited display capabilities may be unable to appreciate the images transmitted by the presenter. For example, if a presenter transmits an image, a PowerPoint presentation page, or a Word page, etc., that is rich in content, the conference attendees who joined the conference via devices with limited display capabilities may simply be unable to see those images or pages with a sufficient clarity. Subsequently, the details that the presenter wished to convey to the attendees may be lost, and the effectiveness of the presentation itself may be diminished.

The presenter could manually simplify or tailor a presentation comprising images, pages of a PowerPoint presentation, etc., to be clearly seen on small-resolution screens, but this approach is inefficient and may result in reduced effectiveness because details have to be eliminated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Optimizing desktop sharing for wireless clients during web collaboration is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Functional Examples
        3.1 Sharing a Particular Window with Attendees
        3.2 Sharing a Particular Window Containing a Word Processing Document
        3.3 Sharing a Particular Window Containing a Graphical Image Bitmap
        3.4 Sharing a Particular Window Containing an HTML Page
    4.0 Implementation Mechanisms—Hardware Overview
    5.0 Extensions and Alternatives
    1.0 General Overview In one embodiment, a computer-implemented method comprises: determining that a presenter of a collaborative online meeting is using a desktop sharing session, determining that one or more attendees participating in the collaborative online meeting are using devices with limited display capabilities, determining a particular window displayed on the desktop of the presenter of the desktop sharing session, and causing transmission of only data from the particular window displayed on the desktop of the presenter to the one or more devices.

In one embodiment, the particular window is a top-most window displayed on the desktop of the presenter. In an embodiment, a top-most window is logically or graphically positioned above other windows or GUI elements which are simultaneously displayed on the screen. A window displayed on the screen display may become the top-most window if it is selected using a pointing device, or other window-selection method. Alternatively, a window may become the top-most window if it is launched by a currently active application, a computer program, an applet, a widget, etc.

In one embodiment, the particular window is an active window displayed on the desktop of the presenter. An active window, as opposed to other windows that are inactive, may be a window that is currently selected by a pointing device or other window-selection methods. Alternatively, an active window is a window that actively collects user's input, etc.

In an embodiment, the computer-implemented method further comprises determining which application program among a plurality of application programs is associated with the particular window.

In an embodiment, the computer-implemented method further comprises determining that a word processing application program is associated with the particular window; and causing one or more devices to receive only text characters of a word processing document that is displayed in the particular window.

In an embodiment, the computer-implemented method further comprises generating a graphical image bitmap of only the particular window. In an embodiment, the method further comprises transforming the data from the particular window into a structured document format prior to causing the one or more devices to receive the data. In an embodiment, the structured document format is hypertext markup language (HTML).

In an embodiment, the computer-implemented method further comprises generating a graphical image bitmap of only the particular window and excluding one or more toolbars, icons and graphical widgets of the particular window.

In an embodiment, the computer-implemented method further comprises receiving one or more messages from a server to which the attendees and the presenter are coupled.

In an embodiment, the computer-implemented method further comprises calling an application programming interface function of an operating system of a computer of the presenter.

In an embodiment, the invention encompasses a computer-readable storage medium and apparatus that are configured with instructions or other means to perform or implement the foregoing steps.

2.0 Structural and Functional Overview

When users share desktop sharing functions, the conventional web conference sharing applications capture the contents of the whole display of the presenter's desktop, and transfer the entire bitmapped image to other attendees participating in the web conference. In contrast, presently disclosed web conference sharing functions identify a particular window displayed on the presenter's screen and display just that window on screens of other attendees participating in the web conference. For example, the disclosed conference sharing functions may identify the particular window as the top-most window displayed on the presenter's screen, and display just the top-most window on screens of the attendees. According to another example, the disclosed conference sharing functions may identify the particular window as a currently active window displayed on the presenter's screen, and display just that window on screens of the attendees. In some implementations, the currently active window displayed on the presenter's screen may be also the top-most window.

Figure 1:
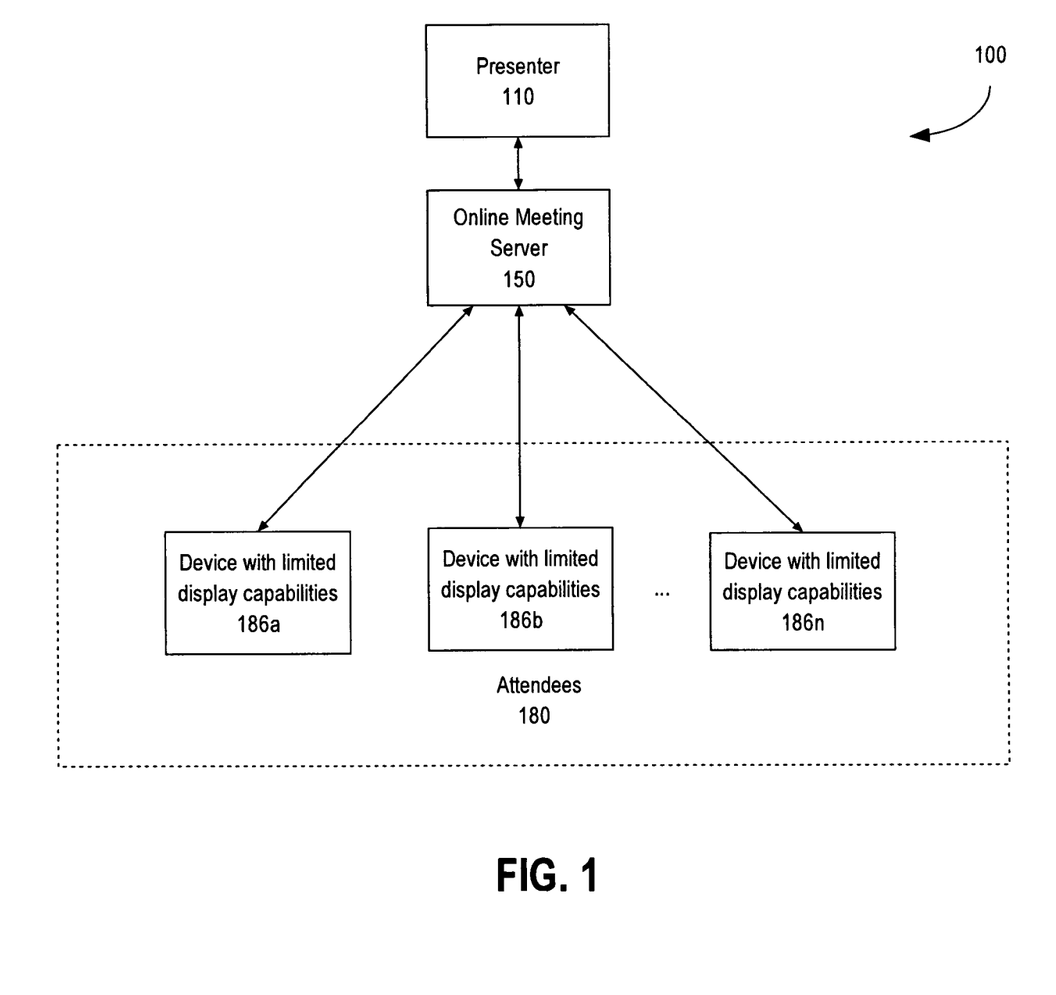
FIG. 1 illustrates an example communication architecture.

FIG. 1 illustrates an example communication architecture. In one embodiment, in a system 100, a presenter's computer 110 is delivering a presentation via an online meeting server 150 to one or more attendees 180. Each of the attendees 180 communicates with the online meeting server 150 using one of a plurality of devices 186a, 186b, 186n having limited display capabilities. Each of devices 186a, 186b, 186n may comprise, for example, a computer having a specialized output device, a cellular radiotelephone, a personal digital assistant (PDA), a combination cell phone-music player, etc.

The presenter's computer 110 is communicatively coupled to an online meeting server 150. The presenter's computer 110 may comprise, for example, a workstation physically connected to the online meeting server 150, a wired and wireless personal computer (PC), etc.

The presenter's computer 110 may comprise a general-purpose computer having one or more central processor units (CPUs), one or more display devices (screens, monitors, etc.), one or more memory units, one or more disk drives, one or more data buses, one or more interfaces, graphical interfaces (GUIs), data input devices, and output devices.

A presenter working from the presenter's computer 110 may launch on the presenter's computer 110 one or more software applications. In response, the presenter's computer 110 displays graphical images and representations associated with those applications on the screen of the presenter's computer 110, as further described herein in relation to FIG. 2A, FIG. 2B.

Any software application useful in a meeting or collaboration may be run on the presenter's computer 110, including but not limited to a presentation application, a word processing document, a browser, a spreadsheet, a project management application, etc.

In a web meeting, the presenter may want to share the display generated on the presenter's computer 110 with other attendees 180. A further description of how the presenter may share the display with attendees 180 is provided herein in relation to FIG. 6, FIG. 7, and FIG. 8.

The communication link between the presenter's computer 110 and the online meeting server 150 may be a wired link, a wireless link, or a combination. For example, the presenter's computer 110 may be physically connected to the online meeting server 150, communicate with the online meeting server 150 wirelessly, or communicate with the online meeting server 150 via a network (or networks) comprising one or more Local Area Networks (LANs), wireless networks, Wide Area Networks (WANs), internetworks, etc.

The communication link between the presenter's computer 110 and the online meeting server 150 may use any of several data communication protocols including but not limited to Internet Protocol (IP), Transmission Control Protocol (TCP), etc. In one embodiment, the communication link between the presenter's computer 110 and the online meeting server 150 may use secure sockets layer (SSL) protocol.

In an embodiment, online meeting server 150 hosts applications to facilitate collaborative or shared communications between the presenter's computer 110 and the attendees 180. For example, online meeting server 150 may run applications to allow scheduling a web meeting, determine which presenter's computer is responsible for conducting the web conference, determine which attendees 180 can join and participate in the web meeting, etc. For purposes of clarity, the functional description herein assumes that scheduling the web meeting, starting the meeting and joining the meeting have been accomplished so that a web conference or a web meeting has been initiated.

Other tasks performed by the online meeting server 150 may include maintaining and controlling secure data exchange during the web meeting, closing of the web meeting, and maintaining communications between the presenter's computer 110 and the devices used by the attendees 180. The online meeting server 150 may be implemented using a general purpose computer having one or more central processing units (CPUs), memory units, disk drives, data buses, interfaces, graphical interfaces (GUIs), etc.

Figure 2A:
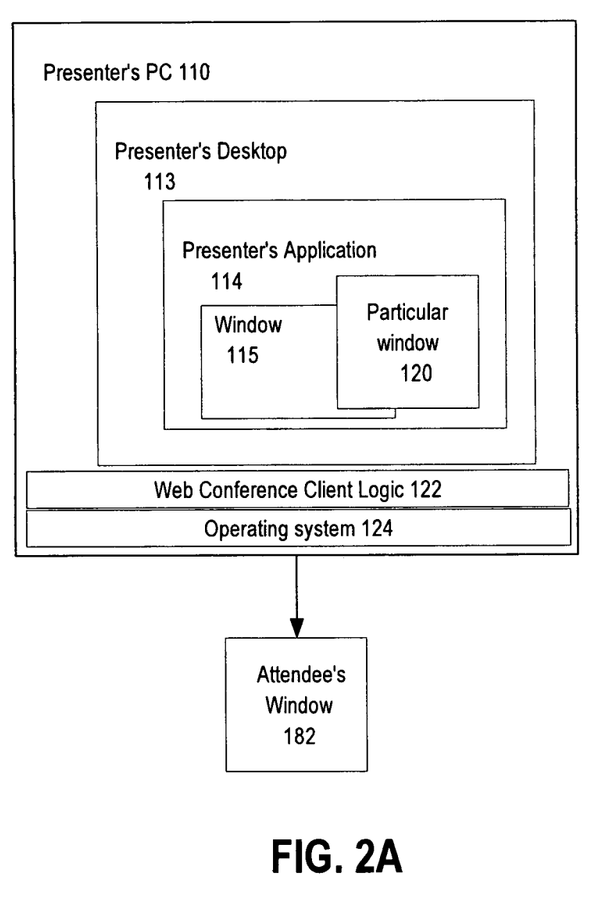
FIG. 2A illustrates a communication flow of information from a presenter's computer to an attendee's computer.

FIG. 2A illustrates a communication flow of information from a presenter's computer to an attendee's computer. As an example, FIG. 2A shows a flow of information from the presenter's computer 110 to an attendee's window 182. The description herein assumes that a web conference or a web meeting has been already initiated, and a logical connection between the presenter's computer 110 and the attendee has been already established.

Upon starting a user session at the presenter's computer 110, the presenter's computer displays one or more images as part of a presenter's desktop 113. Each of the one or more images is controlled by a desktop computer environment comprising a desktop manager or window manager. The desktop 113 comprises various graphical icons, windows, buttons, toolbars, folders, wallpapers, widgets and other graphical elements that cooperate to provide a graphical user interface between the presenter and the presenter's computer 110. Desktop 113 may be generated using a personal computer operating system 124 such as Microsoft Windows, Apple MAC OS X, the Unix X Window system, and the Java Desktop System of Sun Microsystems.

In an embodiment, when a presenter starts or joins the web meeting, the presenter's desktop 113 may comprise images that overlap or at least partially obscure other images. For example, the presenter's desktop 114 may display images associated with a presenter's application 114 and comprising windows 115, 120. Typically the presenter provides user input to or views output from one window at a time. For example, the presenter may select one window, which is redisplayed as a particular window 120 among a visual hierarchy of windows that include one or more underlying windows 115. The particular window 120 may be the top-most window displayed on the presenter's screen, a currently active window displayed on the presenter's screen, the top-most window that also is the active window displayed on the presenter's screen, etc.

Although presenter's desktop 113 may comprise a plurality of applications and windows, during the web meeting the presenter might want to focus on just one particular GUI element such as one window, for any of several reasons. For example, sending more than one window to all meeting attendees might exceed the bandwidth of the communication channels established between the presenter and the attendees, or displaying more than one window on attendees' screens might require scaling down each of the windows to a point where the images displayed on attendees' devices are too small to be clearly seen.

Further, the presenter might want to focus the attention of the attendees on only one window among a plurality of windows on the presenter's desktop 113. For example, the presenter may have a number of windows opened on the presenter's desktop 113, and without launching any new application, the presenter might want to select one of the already displayed windows and make that window the particular window 120. Additionally or alternatively, the presenter may have multiple windows open on the presenter's desktop 113 and might want to select the window that pertains to a particular issue to be discussed by the presenter, and make that window the particular window 120. In an embodiment, when the presenter selects the desirable window from a number of the windows displayed on the presenter's desktop 113, the desirable window "pops up" on the top of the presenter's desktop and is displayed as a top window 120. In other embodiment, when the presenter selects the desirable window from a number of the windows displayed on the presenter's desktop 113, the desirable window becomes an active or the top-most window displayed on the presenter's screen.

In this context, the particular window 120 is a window that is currently selected among all other windows. Under most operating systems that provide a GUI, the currently selected window also is not obscured by any other simultaneously displayed windows or other GUI elements on the presenter's desktop 113. For example, if a desirable window was previously partially obscured by a window 115, once the presenter selects the desirable window, the desirable window may become the top window 120, as illustrated in FIG. 2A, and the window 115 becomes partially obscured by the particular window 120.

Any of several methods may be used for selecting graphical elements on the presenter's desktop 113. For example, a window may be selected by moving a cursor to that window and clicking a button of a mouse connected to the presenter's computer 110 to execute a "select" function. Alternatively, the presenter may select a window by moving a cursor to that window and pressing an "enter" key on the keyboard connected to the presenter's computer 110 to execute a "select" function implement on the keyboard.

In an embodiment, regardless of the number of windows and other graphical elements that are displayed on the presenter's desktop 113, during a web conference, only the selected particular window 120 is sent to the displays on the attendees' computers and only the particular window appears in attendees' windows 182. Window 115, other windows, and other graphical elements of the presenter's application or presenter's desktop 113 are not sent to attendees.

Figure 2B:
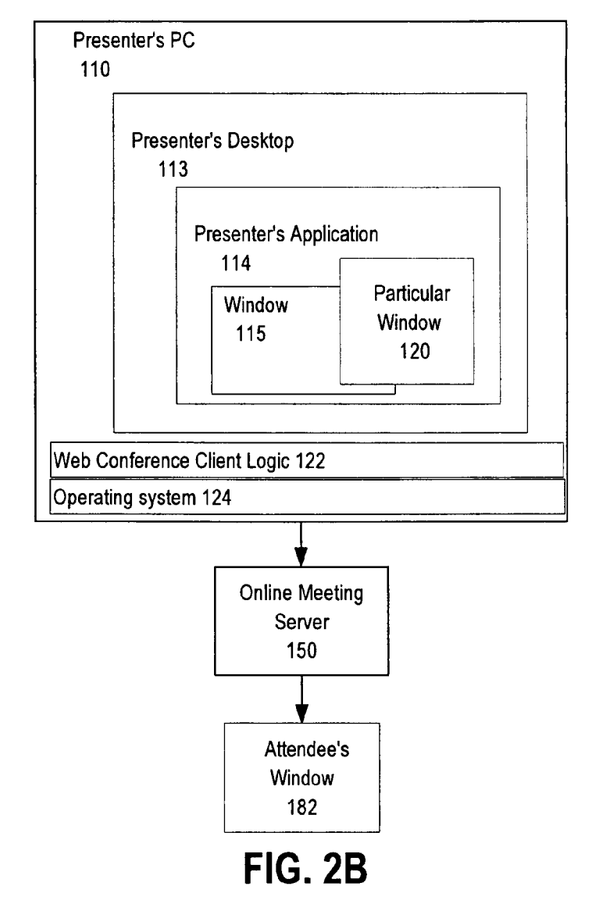
FIG. 2B illustrates a communication flow of information from a presenter's computer to an attendee's computer via an online meeting server.

FIG. 2B illustrates a communication flow of information from a presenter's computer to an attendee's computer via an online meeting server. In particular, FIG. 2B illustrates a communication flow of information passed from the presenter's computer 110 to the attendee's window 182 via the online meeting server 150. As described in FIG. 2A, the presenter might want to select one of the windows displayed on the presenter's desktop 113, make that window the particular window 120 and share that window with attendees 180.

In one embodiment, graphical information for the presenter's desktop 113 in its entirety is sent to the online meeting server 150. Upon receiving the graphical representation of the presenter's desktop 113, the online meeting server 150 identifies the particular window 120, and sends a graphical representation of only the particular window 120 to the attendee's window 182.

In an embodiment, web conference client logic 122 hosted at the presenter's computer 110 determines which window in the presenter's desktop 113 is currently selected as the particular window 120. In an embodiment, the web conference client logic 122 issues a programmatic call to operating system 124, or to a window manager associated with the operating system, and requests an identification of the particular window 120. In response, the operating system 124 returns, in a form that depends on the particular operating system 124, information sufficient to permit the web conference client logic 122 to identify the particular window 120 and the contents of the window. The web conference client logic 122 then sends information only for the particular window 120 to the online meeting server 150. The online meeting server 150 duplicates the received particular window information and delivers the particular window information to the attendee's window 182 for each of the attendees 180 of a web meeting.

Figure 3:
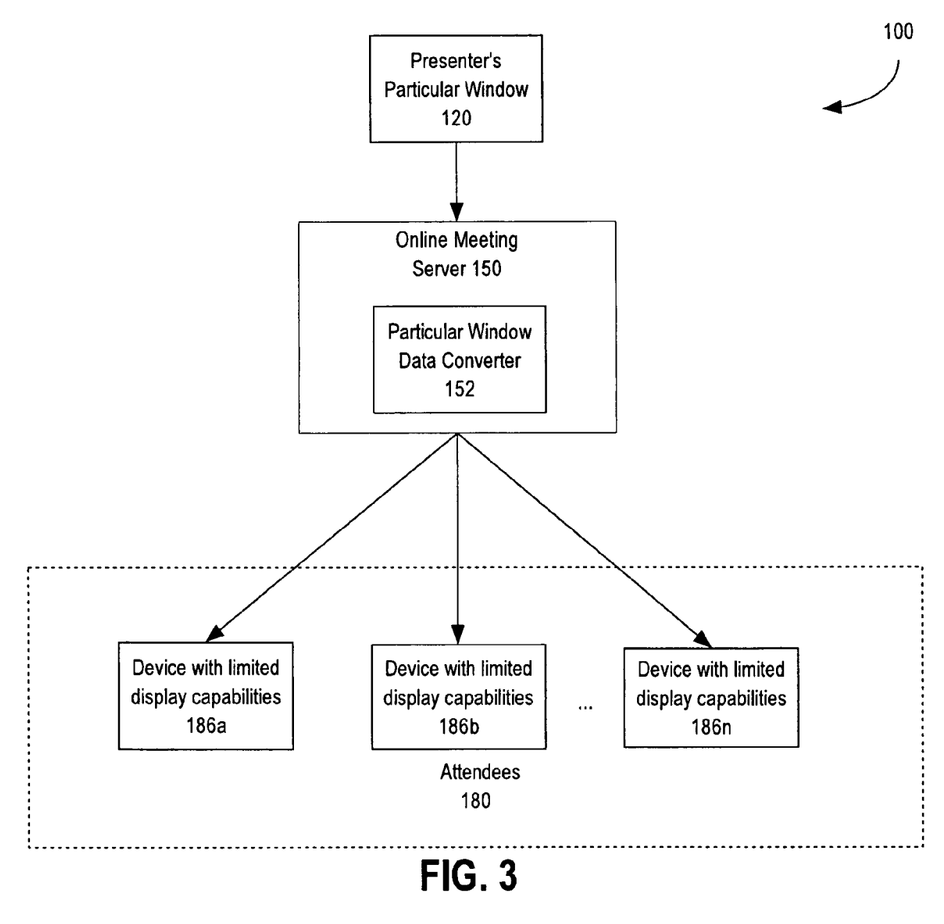
FIG. 3 illustrates a communication flow of information from a presenter's computer to attendees' computers including a data conversion module.

FIG. 3 illustrates a communication flow of information from a presenter's computer to attendees' computers including a data conversion module. In particular, FIG. 3 is a block diagram illustrating a flow of information displayed in the presenter's particular window 120 to the attendees 180 via the online meeting server 150. In an embodiment, online meeting server 150 comprises a particular window data converter module 152 that is configured to convert data from the presenter's particular window 120 to a format compatible with the devices having limited display capabilities 186*a*, 186*b*, 186*n*.

In one embodiment, at least one of the devices 186*a*, 186*b*, 186*n* is incompatible with the presenter's computer 110. For example, one of the devices 186*a*, 186*b*, 186*n* may use a different operating system or window environment than the presenter's computer 110, or the devices 186*a*, 186*b*, 186*n* may use different applications that are not compatible with a format of data used in the presenter's particular window 120. If the devices 186*a*, 186*b*, 186*n* are incompatible with the presenter's computer 110, then data shown in the presenter's particular window 120 may be displayed in a completely different form on the devices 186*a*, 186*b*, 186*n*, or may contain errors, or may be incapable of display.

In an embodiment, device incompatibility issues are addressed using particular window data converter module 152, which can perform data format transformation, image size modification, and other functions. For example, if the presenter's particular window 120 comprises an image in a Joint Photographic Experts Group (JPEG) format, but the device with limited display capabilities 186*a* can only display images in a Tagged Image File Format (TIFF), then the particular window data converter 152 receives as input the JPEG image from the presenter's particular window 120, converts it to an image expressed in the TIFF format, and sends the TIFF image to the device with limited display capabilities 186*a*.

As another example, the presenter's particular window 120 comprises a page of a document in a WordPerfect format, but the device with limited display capabilities 186*b* can only display pages of documents in a Word format. In such a case, the particular window data converter 152 takes as an input the page displayed in the presenter's particular window 120, converts it from the WordPerfect format to the Word format, and sends an output page (expressed in the Word format) to the device with limited display capabilities 186*b*.

In a further example, the presenter's particular window 120 comprises a page of a document in a Word format, but the device with limited display capabilities 186*n* can only display pages of documents in a text-rich format. In such a case, the particular window data converter 152 takes as an input the page displayed in the presenter's particular window 120, converts it from the Word format to the text-rich format, and sends the output page (expressed in the text-rich format) to the device with limited display capabilities 186*n*.

The particular window data converter 152 also may convert graphic image sizes to achieve compatibility. For example, the presenter's particular window 120 may comprise an image of 800×1200 pixels, but the device with limited display capabilities 186*a* may be capable of displaying only small images of up to 300×400 pixels. In such a case, the particular window data converter 152 may down-convert a bitmap image of the particular window 120 into a converted image that is displayable on device 186*a*. Similarly, the presenter's particular window 120 may display a word processing document in which characters occupy cells that are 24×48 pixels, but direct down conversion of such cells would yield characters that are too small to read on the device 186*a*. In such a case, the particular window data converter 152 may convert the text characters into a data representation format or size that is readable on the device 186*a*.

Figure 4:
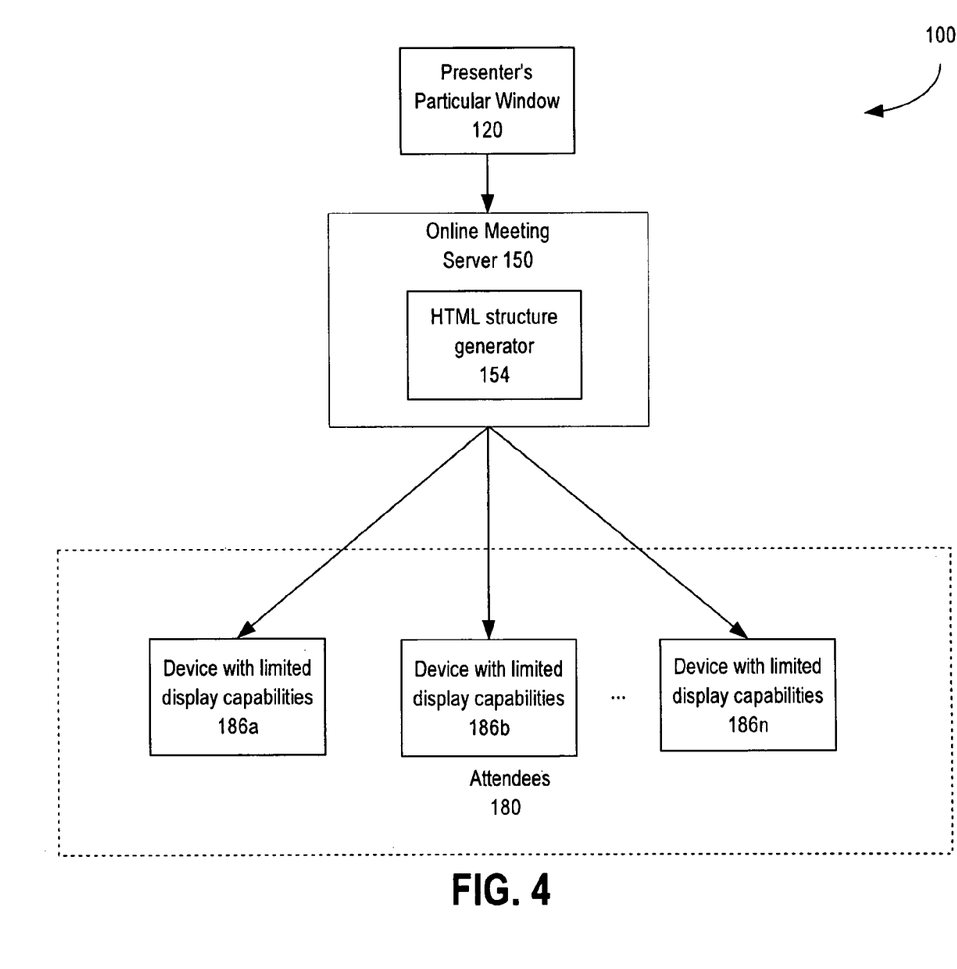
FIG. 4 illustrates a communication flow of information from a presenter's computer to attendees' computers including an HTML structure generator.

FIG. 4 illustrates a communication flow of information from a presenter's computer to attendees' computers including an HTML structure generator. In particular, FIG. 4 is a block diagram illustrating a communication flow of information displayed in the presenter's particular window 120 to the attendees 180 via the online meeting server 150, which includes a Hyper Text Markup Language (HTML) structure generator 154.

In an embodiment, the content of the presenter's particular window 120 is transformed into and represented as an HTML structure, and that structure is sent to the attendees 186*a*-186*n* instead of sending them a bitmap of the presenter's particular window 120. Transforming the presenter's particular window 120 into HTML format enables sending the HTML structure over a network using existing protocols such as Hyper Text Transfer Protocol (HTTP) for transport. For example, the devices with limited display capabilities 186*a*-186*n* may already host a browser application or other means for managing HTTP communications and rendering HTML structures.

In one embodiment, upon receiving data representing the presenter's particular window 120, the online meeting server 150 sends the data to HTML structure generator 154, which performs a conversion of the data to an HTML document, and sends the HTML document to the attendees 180 to be displayed on their devices 186*a*, 186*b* . . . 186*n*.

3.0 Functional Examples

Functional examples are now described with reference to FIG. 5, FIG. 6, FIG. 7 and FIG. 8. The examples of FIG. 5, FIG. 6, FIG. 7 and FIG. 8 may be implemented, for example, in web conference client logic 122 of a presenter's computer 110, or in online meeting server 150, or in logic in each of the presenter's computer 110 and the online meeting server 150 that cooperates to provide the functions described herein.

3.1 Sharing a Particular Window with Attendees

Figure 5:
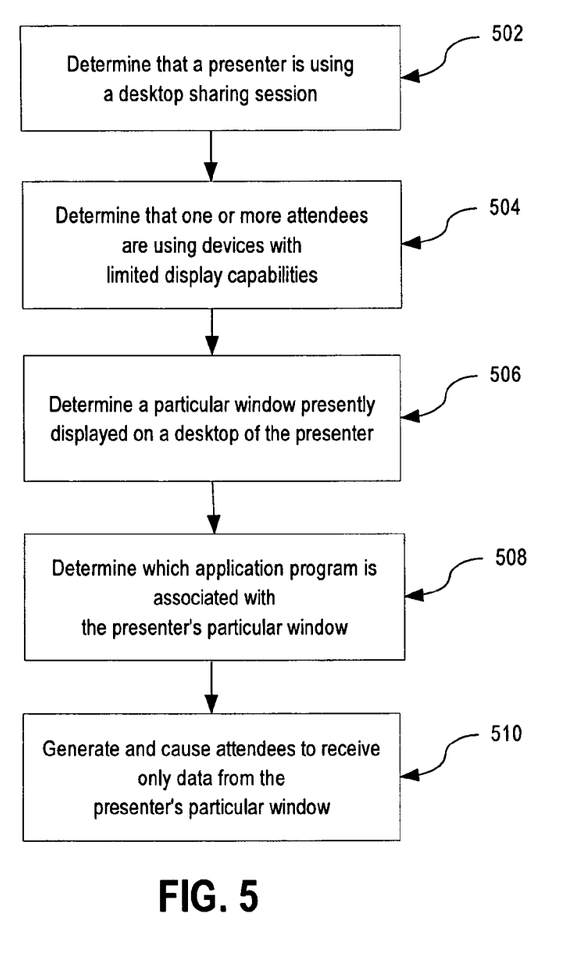
FIG. 5 illustrates one embodiment of a method for optimizing desktop sharing for wireless clients during web collaboration.

FIG. 5 illustrates one embodiment of a method for optimizing desktop sharing for wireless clients during web collaboration.

In step 502, the process determines that a presenter is using a desktop sharing session rather than an application sharing session. In general, a desktop sharing session in a web conference is a session in which data representing a bitmapped image of the desktop of a presenter is distributed to attendees. In contrast, in an application sharing session, both the presenter and the attendees launch and run local copies of a software application, and the session involves communicating application-level data between the copies so that an attendee's local copy of an application will operate in the same manner as the presenter's copy. In an embodiment, the present approach operates in the context of a desktop sharing session.

In an embodiment, online meeting server 150 can determine whether the presenter is using a desktop sharing session using several methods. For example, such a determination may be made upon the initialization of the web conference, when the presenter of the web conference selects whether the web conference will comprise a desktop sharing session or an application sharing session.

Alternatively, the determination whether the presenter is using a desktop sharing session is made after the web conference is initialized. In such a case, the presenter selects the desktop sharing session over the application sharing session while the web conference is in progress. For example, the presenter may use web conference client logic 122 to signal the online meeting server 150 to initiate a desktop sharing session during a web conference.

In step 504, the process determines whether one or more attendees participating in the desktop sharing session are using devices with limited display capabilities. Step 504 may be performed using any of several methods to determine the type of the device which participates in the web conference. For example, such a determination may be made upon the initialization of the web conference; at that time, each device joining the web conference identifies itself to the online meeting server and provides a device identifier value or other identifying information to the online meeting server.

Alternatively, the determination of the type of the device may be made after the online meeting server 150 sends communication packets requesting the device to provide its device type or hardware configuration, and after the device responds to the request by providing the requested information. In still another alternatively, discovery protocols or Web Services methods such as WS-Discovery may be used to discover the type of devices that are participating in a web conference.

In step 506, the process determines which window displayed on the desktop of the presenter is the particular window that the presenter wants to share with other attendees. For example, the process may determine that the presenter wants to share with other attendees the top-most window displayed on the presenter's screen. According to another example, the process may determine that the presenter wants to share with other attendees a currently active window displayed on the presenter's screen. In some implementations, the currently active window on the presenter's screen may be also the top-most window on the presenter's screen. In one embodiment, determining the particular window is performed by web conference client logic 122 issuing a programmatic call to operating system 124, or to a window manager associated with the operating system, and requests an identification of the particular window 120. In response, the operating system 124 returns, in a form that depends on the particular operating system 124, information sufficient to permit the web conference client logic 122 to identify the particular window 120 (e.g. the top-most window, the active window, etc.), and the contents of that window. The web conference client logic 122 then sends information only for the particular window 120 to the online meeting server 150. The online meeting server 150 duplicates the received particular window information and delivers the particular window information to the attendee's window 182 for each of the attendees 180 of a web meeting.

Additionally or alternatively, the web conference client logic 122 may issue an operating system API call for identifying the window which is active as opposed to other windows that are inactive. Additionally or alternatively, the web conference client logic 122 may determine the top-most window displayed in the presenter's desktop based on identifying a first the application that is active (as opposed to other applications launched by the presenter but then-currently inactive), and then identifying a window associated with that application.

In step 508, the process determines which application program is associated with the presenter's particular window. In one embodiment, web conference client logic 122 queries the operating system 124 using an API call and receives a response that identifies the currently selected window. In an embodiment, a window manager or task manager of the operating system maintains a stack of data for each active window and can interface to external calling programs using an API.

In step 510, the process generates and sends to the attendees the data that are representative of the image or the text displayed only in the presenter's particular window. In an embodiment, web conference client logic 122 sends the data from the presenter's particular window to the online meeting server 150, which sends the data to each of the attendees. Other windows or portions of windows on the desktop of the presenter are not sent to the online meeting server 150 and are not sent to attendees. As a result, each receiving attendee receives only the data relating to the currently selected window, which enables a receiving device having a limited display capability to receive and display the data that the presenter is focusing on, without receiving data that cannot be displayed or that would obscure or clutter the device display.

3.2 Sharing a Particular Window Containing a Word Processing Document

Figure 6:
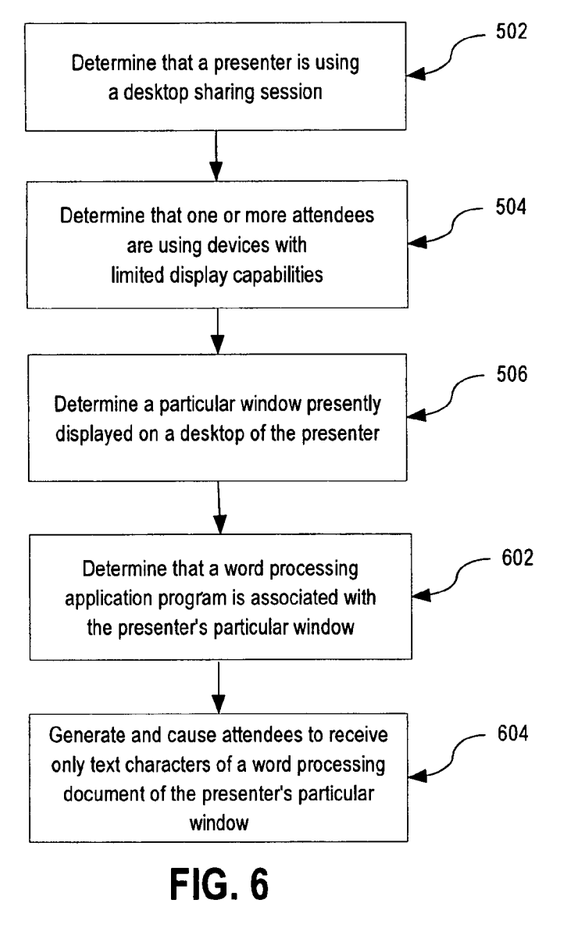
FIG. 6 illustrates one embodiment of a method for optimizing desktop sharing for wireless clients during web collaboration utilizing word processing documents.

FIG. 6 illustrates one embodiment of a method for optimizing desktop sharing for wireless clients during web collaboration utilizing word processing documents. In an embodiment, in the process of FIG. 6 the steps 502, 504 and 506 are performed as described in FIG. 5. After step 506, at step 602, the process determines that a word processing application program is associated with the presenter's particular window. Examples of word processing applications include but are not limited to MICROSOFT WORD, WORDPERFECT, etc.

In an embodiment, step 506 involves the web conference client logic 122 issuing an API call to operating system 124 to obtain a name of the then-currently selected application program or, in certain embodiments, a name of an application program associated with the then-currently selected or particular window. The operating system 124 responds by returning a name of the application program. The web conference client logic 122 then may determine whether a word processing application is in use by comparing the returned name to a pre-configured list of names of word processing applications. Alternatively, the web conference client logic 122 may obtain a filetype or file extension (.DOC, .RTF, .TXT, etc.) associated with a file that is open in the then-currently selected window or the particular window, again using an API call to the operating system. The web conference client logic 122 then can compare the filetype or file extension to a pre-configured list of filetypes or file extensions that indicate word processing application programs.

Upon completing the step 602, the process generates and causes attendees to receive only text characters of the word processing document of the presenter's particular window. In various embodiments, step 602 may include capturing the current page(s) of the word processing document displayed on the presenter's particular window, performing optical character recognition techniques on the captured page(s), and sending output text characters to the online meeting server 150 for delivery to the attendees. Alternatively, step 602 may comprise calling an API function of the word processing application program and obtaining in response a text version of the currently displayed document. In still another alternative step 602 may comprise identifying a data file that contains the word processing document, opening the data file and converting the contents of the data file from a word processing format to a plain text format or a character format, or extracting only text characters from the file through a process of format conversion or interpretation of codes in the file.

As a result, the approach herein can deliver the content of a word processing document to attendees who are using devices that otherwise cannot display a desktop window that contains the content. For example, the approach can provide, to attendees who are using devices for which displaying the output of a word processing application would be impractical or impossible, the text characters that are shown in the current word processing document without also sending toolbars, icons, fancy formatting, and other information that the word processing application normally renders, but which the attendees' devices cannot display.

3.3 Sharing a Particular Window Containing a Graphical Image Bitmap

Figure 7:
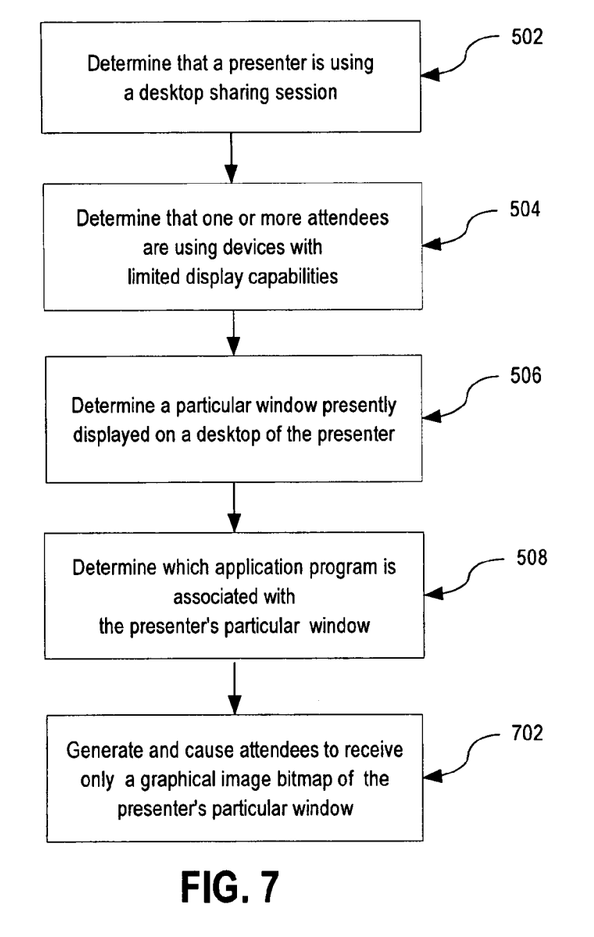
FIG. 7 illustrates one embodiment of a method for optimizing desktop sharing for wireless clients during web collaboration utilizing graphical image bitmaps.

FIG. 7 illustrates one embodiment of a method for optimizing desktop sharing for wireless clients during web collaboration utilizing graphical image bitmaps. In an embodiment, steps 502, 504, 506 and 508 depicted in FIG. 7 are performed in the same manner as steps 502, 504, 506 and 508, respectively, of FIG. 5, as described above.

In an embodiment, after step 508, in step 702 the process generates and causes attendees to receive only a graphical image bitmap of the presenter's particular window. In this context, a bitmap is a data structure representing a generally rectangular grid of pixels, or points of color, viewable via a monitor or other display medium. Bitmap images may be stored in image files with varying formats (such as, for example, ".bmp," ".xpm," ".wbmp," etc.) A bitmap generally corresponds bit-for-bit to an image displayed on a screen, and generally is in the format used in the display's video memory. A bitmap is technically characterized by the width and height of the image measured in the number of pixels and by the number of bits per pixel. Step 702 may include capturing the image displayed on the presenter's particular window, converting that image to a bitmap, and sending the bitmap to the attendees.

3.4 Sharing a Particular Window Containing an Html Page

Figure 8:
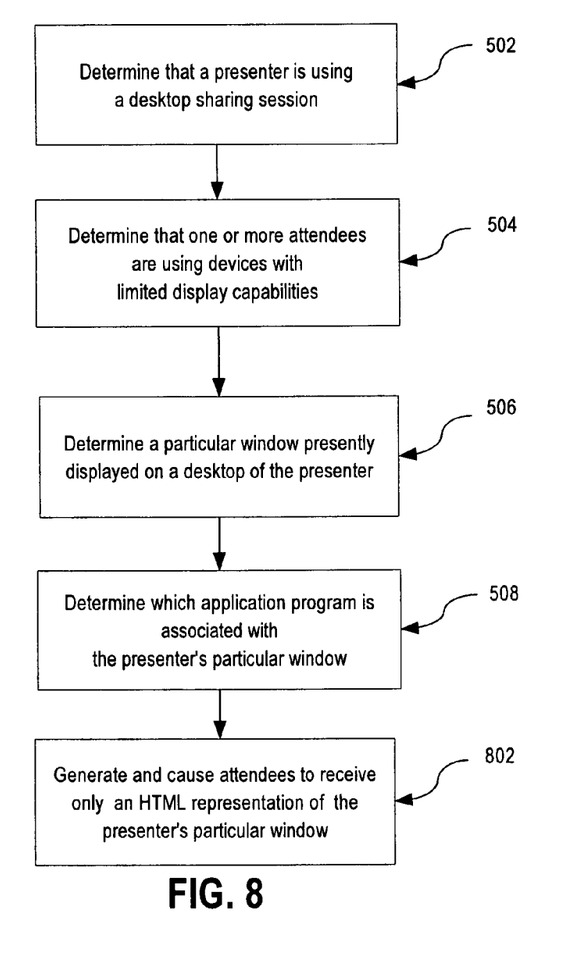
FIG. 8 illustrates a high level overview of one embodiment of a method for optimizing desktop sharing for wireless clients during web collaboration utilizing HTML documents.

FIG. 8 illustrates a high level overview of one embodiment of a method for optimizing desktop sharing for wireless clients during web collaboration utilizing HTML documents. In an embodiment, steps 502, 504, 506 and 508 depicted in FIG. 8 are performed in the same manner as steps 502, 504, 506 and 508, respectively, of FIG. 5, as described above.

In an embodiment, after step 508, in step 802 the process generates and causes attendees to receive only an HTML representation of the presenter's particular window rather than a bitmap of the presenter's particular window. In an embodiment, in step 802 the web conference client logic 122 captures the data displayed on the presenter's particular window, converts the data to HTML format data, and sends the HTML data to the online meeting server 150 for sending to the attendees. In various embodiments, step 802 may comprise obtaining window contents by performing one or more API calls to an application program associated with the particular window, or by performing a file conversion operation on a file that is open in an application program that is associated with the particular window. When the content has been obtained, the content may be converted to HTML data using an HTML conversion process or tool. For example, HTML conversion may comprise packaging text contents of the particular window in HTML tags that capture text centering, boldface, or various kinds of paragraph formatting. The converted HTML is then provided to the online meeting server 150.

4.0 Implementation Mechanisms—Hardware Overview

Figure 9:
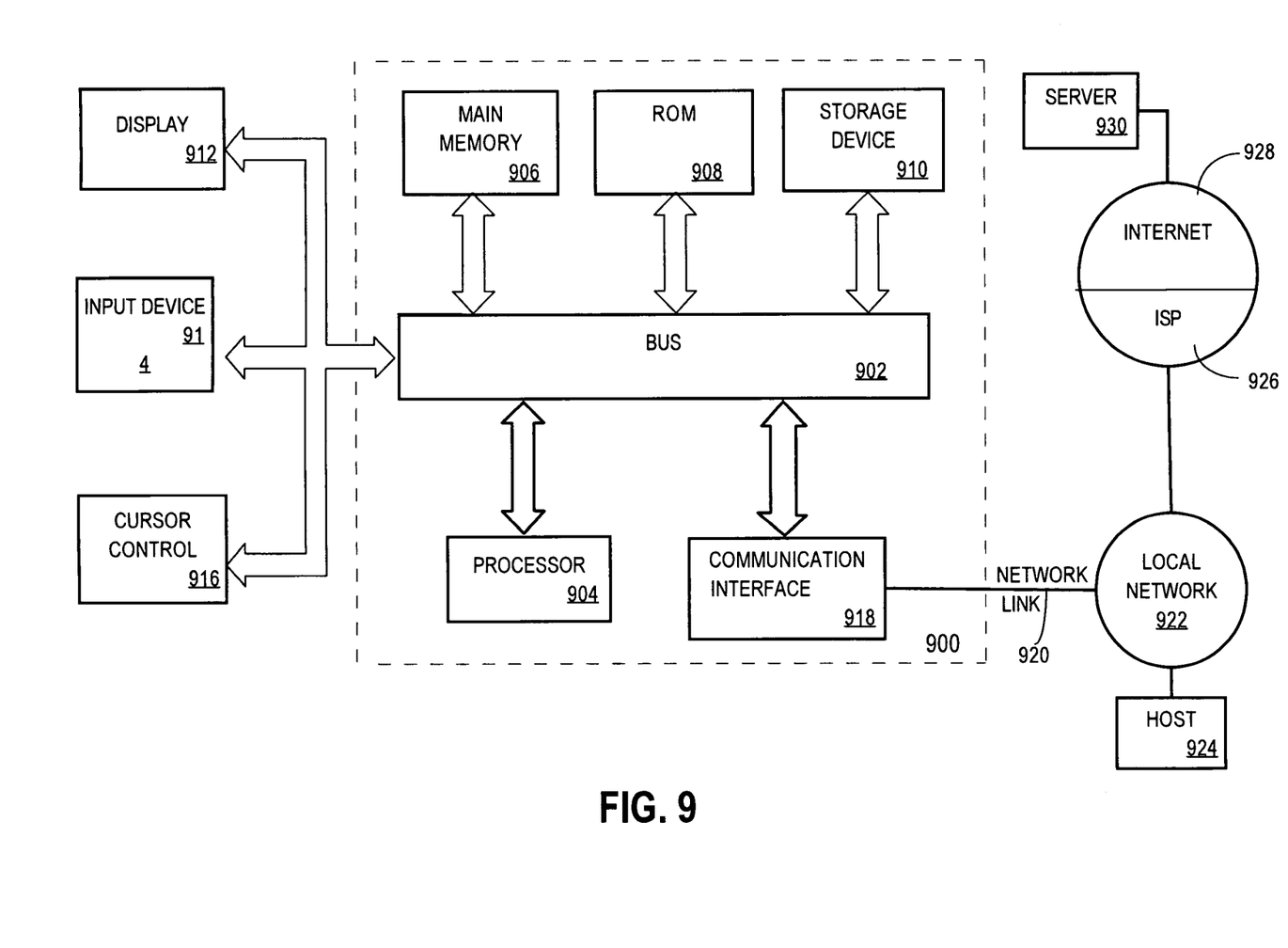
FIG. 9 illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to storage media. Storage media includes both non-volatile media and volatile media. Non-volatile media includes, for example, optical or magnetic disks, such as storage device 910. Volatile media includes dynamic memory, such as main memory 906.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
at an online meeting server, coupled to a presenter and a plurality of attendees:
determining that the presenter of a collaborative online meeting is using a desktop sharing session;
determining that one or more attendees, from the plurality of attendees, who are participating in the collaborative online meeting, are using respective one or more devices with limited display capabilities;
determining, from among a plurality of graphical user interface windows that are then-currently displayed on a desktop of the presenter of the desktop sharing session, a particular window that is one of a plurality of windows; and
causing transmission of only data from the particular window displayed on the desktop of the presenter to the one or more devices;
determining that a word processing application program is associated with the particular window;
causing one or more devices to receive only text characters of a word processing document that is displayed in the particular window.

2. The computer-implemented method of claim 1, further comprising generating a graphical image bitmap of only the particular window.

3. The computer-implemented method of claim 1, further comprising transforming the data from the particular window into a structured document format prior to causing the one or more devices to receive the data.

4. The computer-implemented method of claim 3, wherein the structured document format is hypertext markup language (HTML).

5. The computer-implemented method of claim 1, further comprising generating a graphical image bitmap of only the particular window and excluding one or more toolbars, icons and graphical widgets of the particular window.

6. The computer-implemented method of claim 1, further comprising receiving one or more messages from a server to which the attendees and the presenter are coupled.

7. The computer-implemented method of claim 1, further comprising calling an application programming interface function of an operating system of a computer of the presenter.

8. A non-transitory computer-readable storage medium storing one or more sequences of instructions which, when executed by one or more processors, cause the one or more processors to perform:
at an online meeting server, coupled to a presenter and a plurality of attendees:
determining that the presenter of a collaborative online meeting is using a desktop sharing session;
determining that one or more attendees, from the plurality of attendees, who are participating in the collaborative online meeting, are using respective one or more devices with limited display capabilities;
determining, from among a plurality of graphical user interface windows that are then-currently displayed on a desktop of the presenter of the desktop sharing session, a particular window that is one of a plurality of windows; and,
causing transmission of only data from the particular window displayed on the desktop of the presenter to the one or more devices;
determining that a word processing application program is associated with the particular window; and
causing the one or more devices to receive only text characters of a word processing document that is displayed in the particular window.

9. The storage medium of claim 8, further comprising instructions which, when executed, cause generating a graphical image bitmap of only the particular window.

10. The storage medium of claim 8, further comprising instructions which, when executed, cause transforming the data from the particular window into a structured document format prior to causing the one or more devices to receive the data.

11. The storage medium of claim 10, wherein the structured document format is hypertext markup language (HTML).

12. The storage medium of claim 8, further comprising instructions which, when executed, cause generating a graphical image bitmap of only the particular window and excluding one or more toolbars, icons and graphical widgets of the particular window.

13. The storage medium of claim 8, wherein the instructions which, when executed, cause determining that the one or more attendees are using respective one or more devices with limited display capabilities further comprise instructions which, when executed, cause receiving one or more messages from the online server to which the attendees and the presenter are coupled.

14. The storage medium of claim 8, wherein the instructions which, when executed, cause determining the particular window that is one of the plurality of windows further comprise instructions which, when executed, cause calling an application programming interface function of an operating system of a computer of the presenter.

15. An apparatus, comprising:
one or more processors;
a computer-readable storage medium storing encoded thereon one or more sequences of instructions which, when executed by one or more processors, cause the one or more processors to perform:
at an online meeting server, coupled to a presenter and a plurality of attendees:
determining that the presenter of a collaborative online meeting is using a desktop sharing session rather than an application sharing session;
determining that one or more attendees, from the plurality of attendees, who are participating in the collaborative online meeting, are using respective one or more devices with limited display capabilities;
determining, from among a plurality of graphical user interface windows that are then-currently displayed on a desktop of the presenter of the desktop sharing session, a particular window that is one of a plurality of windows; and,
causing transmission of only data from the particular window on the desktop of the presenter to the one or more devices;
determining that a word processing application program is associated with the particular window; and
causing one or more devices to receive only text characters of a word processing document that is displayed in the particular window.

16. The apparatus of claim 15, further comprising instructions which, when executed, cause generating a graphical image bitmap of only the particular window.

17. The apparatus of claim 15, further comprising instructions which, when executed, cause transforming the data from the particular window into a structured document format prior to causing the one or more devices to receive the data.

18. The apparatus of claim 15, further comprising instructions which, when executed, cause generating a graphical image bitmap of only the particular window and excluding one or more toolbars, icons and graphical widgets of the particular window.

19. The computer-implemented method of claim 1, wherein the particular window is a top-most window of the plurality of windows.

20. The computer-implemented method of claim 1, wherein the particular window is an active window of the plurality of windows.

21. The computer-readable storage medium of claim 8, wherein the particular window is a top-most window of the plurality of windows.

22. The computer-readable storage medium of claim 8, wherein the particular window is an active window of the plurality of windows.

23. The apparatus of claim 15, wherein the particular window is a top-most window of the plurality of windows.

24. The apparatus of claim 15, wherein the particular window is an active window of the plurality of windows.

25. The computer-implemented method of claim 1, further comprising determining which application program among a plurality of application programs is associated with the particular window.

26. The storage medium of claim 8, further comprising instructions which when executed cause determining which application program among a plurality of application programs is associated with the particular window.

27. The apparatus of claim 15, further comprising instructions which when executed cause determining which application program among a plurality of application programs is associated with the particular window.

* * * * *